May 28, 1963     H. E. TATEL     3,091,765
ANTI-COLLISION SYSTEM FOR SHIPS AND PLANES
Filed June 13, 1957     4 Sheets-Sheet 1

INVENTOR.
HOWARD E. TATEL
BY
ATTORNEY.

May 28, 1963

H. E. TATEL 3,091,765

ANTI-COLLISION SYSTEM FOR SHIPS AND PLANES

Filed June 13, 1957

INVENTOR.
HOWARD E. TATEL
BY
ATTORNEY.

May 28, 1963    H. E. TATEL    3,091,765
ANTI-COLLISION SYSTEM FOR SHIPS AND PLANES
Filed June 13, 1957    4 Sheets-Sheet 3
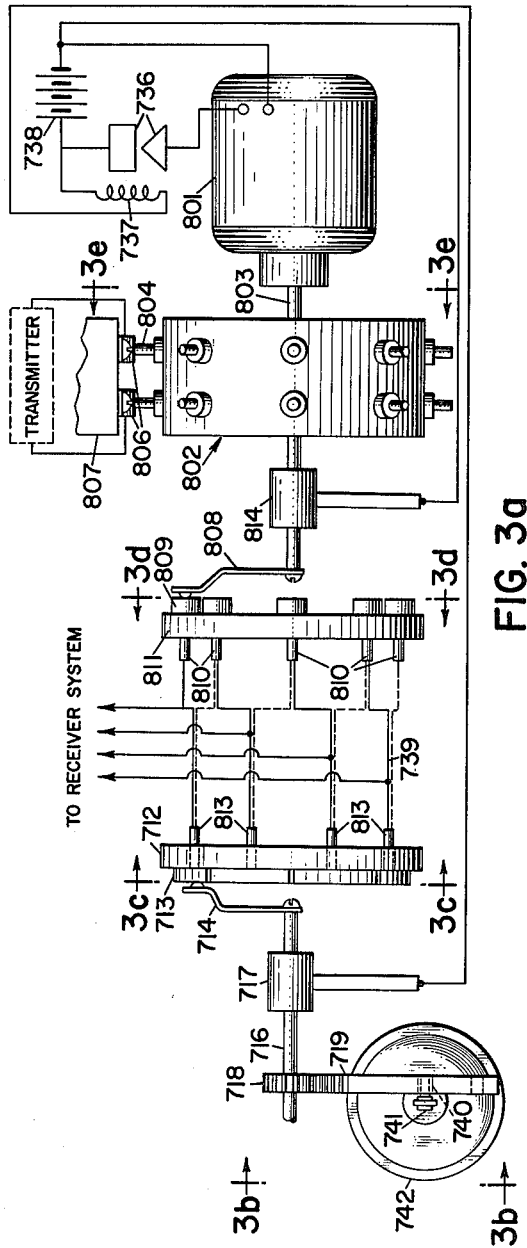
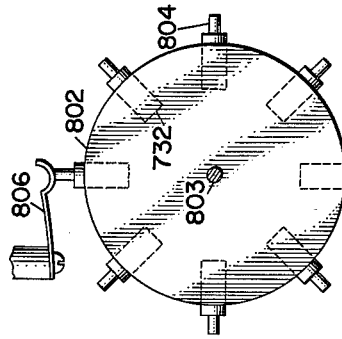
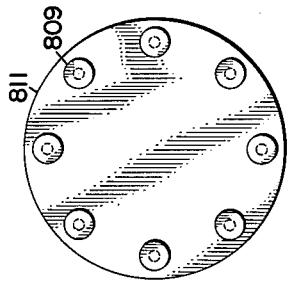
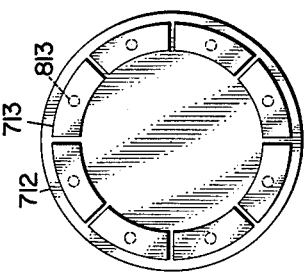
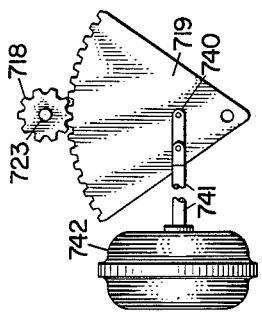
INVENTOR
HOWARD E. TATEL May 28, 1963     H. E. TATEL     3,091,765
ANTI-COLLISION SYSTEM FOR SHIPS AND PLANES
Filed June 13, 1957     4 Sheets-Sheet 4

INVENTOR.
HOWARD E. TATEL
BY
*ATTORNEY.*

3,091,765
ANTI-COLLISION SYSTEM FOR SHIPS
AND PLANES
Howard E. Tatel, Silver Spring, Md., assignor of 15 percent to Jules H. Sreb, Washington, D.C., 21.25 percent to William L. Abramowitz, Swampscott, Mass., 21.25 percent to William Epstein and 15 percent to Joseph Zallen, both of Brookline, Mass.; Molly Tatel, executrix of said Howard E. Tatel, deceased
Filed June 13, 1957, Ser. No. 665,440
8 Claims. (Cl. 343—102)

This invention relates to an anti-collision warning system for ships and planes. In particular, it relates to a method whereby any ship or plane can continuously and automatically and in all weather conditions determine the relative directions of motion of all its neighbors with respect to its own direction of motion, thus providing information enabling the avoidance of collision.

My co-pending patent application of the same title, Serial 629,842, filed December 21, 1956, discloses a system wherein each craft has a radio beacon emitting prescribed signals in all directions at a single universal frequency and a radio receiver operative at this universal frequency which instantaneously compares and displays the angle between the bearing of the reading craft and the heading of any neighboring craft. The specific embodiment described therein utilizes a beacon emitting an omnidirectional component isotropic in phase and amplitude and another component whose phase only depends upon direction of transmission. In one form, the transmitted signal contains an omnidirectional RF component modulated by a reference signal and an RF component modulated by a signal which is a multiple of the reference signal and whose phase angle of modulation with respect to the multiple of the reference signal is proportional to the angle that the direction of transmission to the receiving vessel makes with the heading of the transmitting vessel. The receiver demodulates both the direction-sensitive and reference components, transforms the reference component to the same multiple frequency as the direction-sensitive component and maintains its phase precisely as at the transmitter, and compares the phase angle difference, namely, heading. The bearing is obtained by receiving an unmodulated RF signal component on both a directional sensitive antenna and omnidirectional antenna, balance modulating each with AF signals of frequency equal to an internal reference signal, and comparing the phase angle difference, namely, bearing. It is preferred that the transmitter and receiver on each craft are operated alternately and in a random manner. For planes, it is preferred that the universal frequency for each altitude zone be different and automatically shifted as the plane goes from one zone to another. Altitude information is supplied as a different multiple of the modulation on the RF carrier. Presentation is preferably made on a persistent-screen cathode ray tube.

In this present invention, the signal is also emitted from the beacon. A transmitted sequence control is provided which causes each transmitted signal to consist of two successive unmodulated pulses of equal time length, one pulse feeding an antenna component, isotropic in the horizontal plane (isotropic antenna component) and the other pulse an omnidirectional antenna component which shifts its phase by an angle depending upon the direction of transmission. At the receiver, the signal is received by the isotropic antenna component and fed to a first channel, and also by a directionally sensitive antenna component and fed to a second channel. The phase of the two resultant signals is compared to give bearing. The signal into the first channel is also fed to both a delay line with delay time equal in length to that of a transmitted pulse and to a switch registered to open only with the onset of the succeeding or second pulse in the transmitted signal. Phase comparison of these two signals, one delayed, the other not, provides the phase difference corresponding to the direction of emission at the transmitter, hence the heading.

With this present invention, there is an advantage of both apparatus simplicity and a phase accuracy dependent only on antenna adjustment and independent of tubes and power supply. It is preferred in this invention, as in the copending application, that the transmitter and receiver on a particular craft be operated alternately and randomly to permit effective operation in heavy traffic at the single universal frequency. Also, for planes, it is preferred that the frequency be different for each altitude zone and be automatically adjusted as the plane passes from one zone to another. Where altitude information is desired it is preferably supplied by a short additional pulse in the transmitted signal, preferably following for two equal-time directional pulses, the length of the altitude pulse providing the altitude measure. An aneroid element supplies the altitude measure and the control for frequency switching with zone change.

For a fuller understanding of this invention, reference is made to a specific embodiment described below and in the drawings wherein:

FIGURE 3a illustrates the altitude zoning device in the form of a schematic diagram wherein an aneroid capsule is the actuating device.

FIGURE 3b illustrates the aneroid capsule pivotally linked to a gear.

FIGURE 3c is a left side view of insulating block 712 showing a number of conducting segments.

FIGURE 3d is a right side view of insulating block 811 showing a number of metal buttons.

FIGURE 3e is left side view of a crystal turret assembly 802 showing spaced crystals with contacts.

Figure 1:
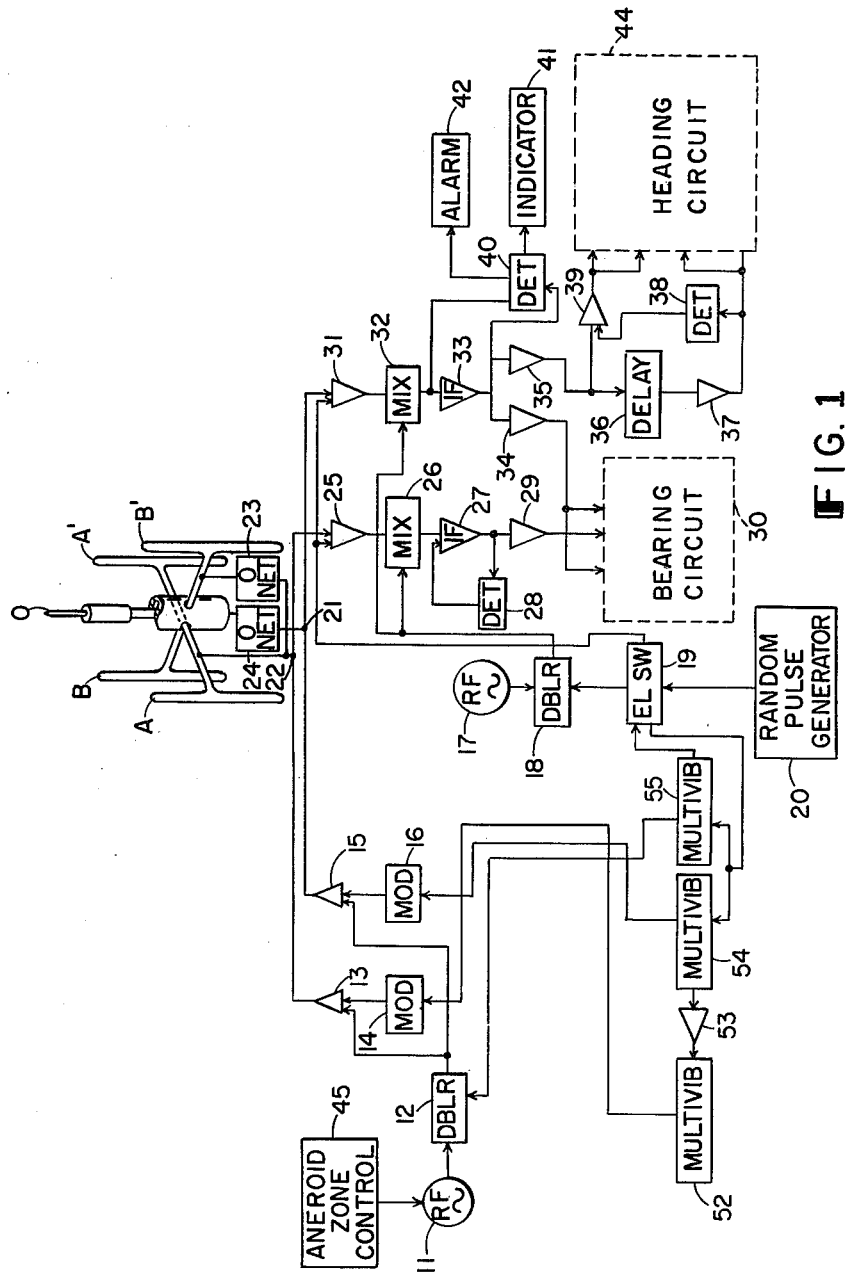
FIGURE 1 is a schematic diagram of the transmitter, receiver and antenna on a single craft, in this case an airplane.

Referring now to FIGURE 1, a quartz crystal oscillator 11, operating at a frequency of e.g. $w/18$ cycles per second drives harmonic generator 12 which provides a frequency of $w$ cycles per second (e.g. 600 megacycles). Harmonic generator 12 in turn drives RF power amplifiers 13 and 15. Power amplifier 13 drives the antenna component which is amplitude constant in all directions but which shifts its phase angle with direction of transmission. This component in this case is crossed Adcock pairs AA', BB', with the signal from T-junction 22 going directly to AA' but through a 90° phase-shift network 23 to BB'. Power amplifier 15 drives the horizontally isotropic radiator O via T-junction 21 and phase-shift network 24.

Control of the transmission is provided by control of the harmonic generator as to total signal length and by separate keying modulators 14 and 16 for providing successive equal-time pulses from power amplifiers 13 and 15 respectively.

The programming initiation control is provided by random pulse generator 20, which in this case is a photo-multiplier tube whose cathode is illuminated by alpha particle ionization radiation from radium (in minute amount but of sufficient quantity to provide the appropriate mean pulse rate) dispersed in a sodium iodide crystal. The output pulses of the photomultiplier actuate transmit-receive switch 19, which provides an asymmetric gating pulse so that the receiver is on most of the duty cycle. The transmit-receive switch gates the receiver oscillator and all RF amplifiers in phase opposition to the transmitter. This action of the transmit-receive switch allows the receiver to receive a signal from any nearby craft except for the infrequent chance coincidence when both transmitters are on. A pulse from transmit-receive switch 19 feeds into monostable multivibrator 54 (500 microsecond pulse) and monostable multivibrator 55 (1000 microseconds pulse). The pulse from 55 turns on harmonic generator 12 generating the RF signal of proper frequency. At the same time, the pulse from 54 turns on keying modulator 16 actuating power amplifier 15. R pulse from 54 passes through amplifier 53 where it is inverted and triggers monostable multivibrator 52, which is identical to 54, and thus turns on keying modulator 14, which in turn energizes power amplifier 13. A return line from multivibrator 55 to transmit-receive switch 19 passes the 1000 microsecond signal back, for the purpose, as explained below, of turning off the two receiver channels 25 and 31 while transmission is on. At the end of the 1000 microsecond pulse, the transmitter goes off and the receiver goes on and remains on until the next control pulse from random generator 20.

In the receiver there are two channels: the first channel comprising a superheterodyne system of RF amplifier 25, mixer 26, IF amplifier 27 and detector 28, which is connected back to amplifier 27 by an automatic gain control loop. This channel receives its signal through T-junction 22 from the crossed Adcock pairs AA', BB'. The second channel receives its signal from isotropic radiator O through T-junction 21 and comprises a superheterodyne system of RF amplifier 31, mixer 32, IF amplifier 33 and detector 40, and thence back to 33 to form an AGC loop. Both channels are connected to a common quartz crystal local oscillator 17 (w/18 frequency) which drives harmonic generator 18 generating a frequency w which feeds directly to mixers 26 and 32. The transmit-receive switch control referred to above is applied to the harmonic generator 18 and to amplifiers 25 and 31 by gating so as to completely turn off the receiver when the local transmitter is on.

The IF signal from 33 drives power amplifiers 34 and 35. Amplifier 34 provides stable low impedance drive for phase sensitive detectors in bearing circuit 30. The IF signal from 27 drives power amplifier 29 which also drives phase-sensitive detectors in the bearing circuit 30.

Power amplifier 35 sends its signal to both a delay line 36 and to a gated phase-shifter amplifier 39. Amplifier 39 is normally off and operates only after the delayed signal passes out through amplifier 37 thence to detector 38 which gates 39 and holds it on for the duration of the pulse.

Both gain stabilized amplifier 37 and phase shift amplifier 39 deliver signals to phase-sensitive detectors in the heading circuit 44, with amplifier 37 providing the phase reference signal for the signal from amplifier 39.

Control for the indicator 41 is provided by the output of detector 40 which receives its signal from power amplifier 33 in the isotropic receiver channel. The intensity of the cathode ray tube 112 in the indicator is turned on when the signal first arrives and then off at the end of the pulse.

Figure 2:
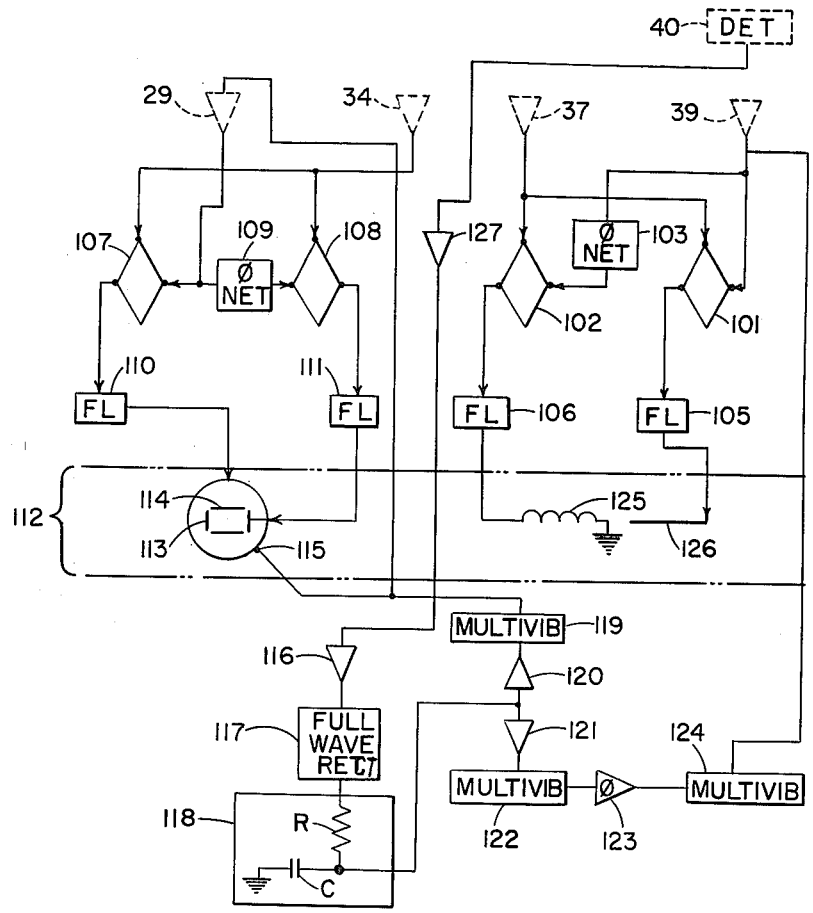
FIGURE 2 is a schematic diagram of the heading and bearing portions of FIGURE 1 showing the arrangement for instantaneous and simultaneous presentation of heading and bearing on persistent screen cathode ray tube.
Figure 4:
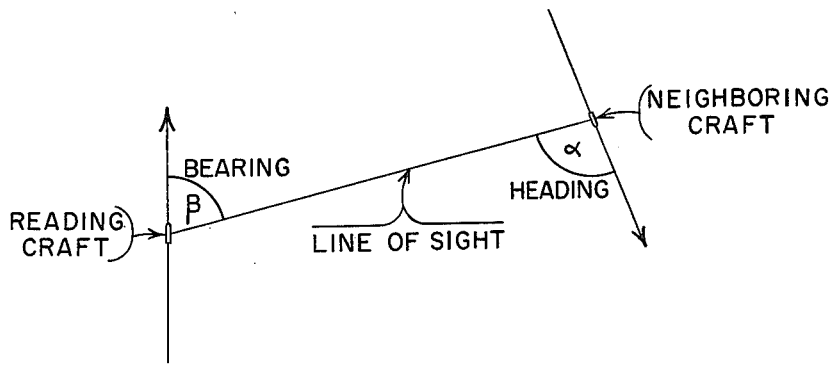
FIGURE 4 illustrates the heading and bearing of a neighboring craft with respect to a reading craft.
Figure 5:
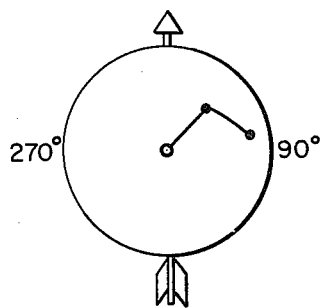
FIGURE 5 shows the cathode ray tube display.

In the bearing portion of the indicator circuit (see FIGURE 2), the output from amplifier 34 drives phase sensitive detectors 107 and 108 as the phase standard, while the output from amplifier 29 at a lower amplitude level drives phase-sensitive detectors 107 as a signal to be measured, and passes through 90° phase-shifting network 109 before entering detector 108 as a signal to be measured. The output from detector 107 is proportional to cosine beta (bearing angle) while the output from 108 is proportional to sine beta.

In the heading portion of the indicator circuit, both the delayed phase standard wave train pulse from amplifier 37 at a high level as a phase standard and the second transmitted wave train pulse, phased through transmission by an angle alpha (equal to relative heading) and coming from amplifier 39 at a low level, simultaneously, directly, and separately drive phase-sensitive detector 101, whose output is then proportional to cosine alpha. Likewise, both pulses drive phase-sensitive detector 102, but the output from 39 is shifted 90° in phase by phase-shifting network 103, with the result that the output of detector 102 is proportional to sine alpha.

The simultaneous presentation of the heading and bearing angles in cathode ray tube 112 is accomplished as follows:

Tube 112 is an electrostatic deflection cathode ray tube with an axially aligned radial deflection electrode 126 at the tube screen or face and a coaxial coil 125 wound around its neck. Horizontal deflection plates 113 are driven by the envelope of the signal which is proportional to sine beta from phase-sensitive detector 108 and is amplified by pulse amplifier and RC filter 111, while vertical deflection plates 114 are driven by the signal proportional to cosine beta supplied by phase sensitive detector 107 through pulse amplifier and RC filter 110. The signal proportional to sine alpha supplied by the phase sensitive detector 101 feeds through output pulse amplifier and RC filter 105 to radial deflection electrode 126, while the signal from 102 proportional to cosine alpha feeds through pulse amplifier and RC filter 106 to the coaxial coil 125. The time constants of the filters are adjusted so that the voltages come to full value in about one-fifth of the total duty cycle of the presentation. The current in coil 125 produces an axial magnetic field, whose variation causes a spot to move on an arc centered at the face electrode. Variation of voltage on the radial deflecting electrode 126 causes a spot to trace a radial line. Sequence control, as indicated below, causes the bearing trace to form first and then the heading trace.

The intensity of the cathode ray tube is governed as follows: The output of detector 40 of the isotropic receiver channel is amplified at amplifier 127. The intensity is turned on when the signal first arrives and then diminishes to zero at the end of the cycle. The signal from detector 40 is fed to amplifier 127 thence into phase-inverter amplifier 116 which drives full-wave rectifier 117. After full wave rectification, the signal passes to RC filter 118 where a charge is stored in condenser C after leaking through resistance R, providing a brief time delay. The output of filter 118 drives cathode-coupled amplifiers 120 and 121. Amplifier 120 triggers monostable multivibrator 119 whose pulse length equals the duty cycle and which supplies gating pulses to amplifier 29 and cathode ray grid 115. Amplifier 121 operates monostable multivibrator 122 whose output pulse is inverted in phase in phase inverter amplifier 123 and then triggers monostable multivibrator 124. Multivibrator 124 supplies pulses to the gating grid of amplifier 39.

During the first half of the duty cycle of presentation the cosine beta and sine beta voltages generate a radial line trace on the CR face as they increase to their maximum, the CR intensity being on as controlled by multivibrator 119 which also gates on the amplifier 29. After multivibrator 122 reverts to its original state (one-half time of the duty cycle) its reversion pulse through phase inverter 123 triggers multivibrator 124, whose pulse length equals the rest of the cycle. This pulse gates and holds on amplifier 39 which drives the phase detectors 102, 101 and generates the sine alpha and cosine alpha signals used to form the heading trace. Then the multivibrators 119 and 122 revert back to original state and the cycle is over.

The altitude-sensing device 45, to be explained in further detail, serves to automatically shift the basic RF frequencies of transmitter and receiver in each plane when the plane moves from one predetermined altitude zone to another. The mechanical arrangement is illustrated in FIGURE 3.

The altitude sensing element causes appropriate shifts in frequency for both the transmitter and receiver. The arrangement of this altitude zoning device is illustrated in FIGURE 3 wherein (a) is the general schematic diagram and side view, (b) the front view of a portion of the aneroid linkage action, (c) a left front view of insulating block 712 with its eight conducting centers, and (d) a right front view of the crystal turrets.

The expansion and contraction of aneroid capsule 742 caused by changes in air pressure with altitude is arranged to step-wise bring a different operative quartz crystal into the transmitter and receiver oscillators. The same aneroid functions for both transmitter and receiver, and the shifting from one crystal to another in both the receiver and transmitter system oscillators 11 and 17 is accomplished electro-mechanically. FIGURE 3a, b, c, d and e illustrate the aneroid, the mechanically coupled shifting means, and the transmitter responsive shifting means, the receiver responsive shifting means being substantially identical with that of the transmitter-responsive shifting means and not illustrated. Wiring network 739 controls the receiver shifter simultaneously and in the same manner as that of the transmitter.

Capsule 742 in response to changes in air pressure moves linkage 741 pivoted on point 740 on gear 719. Gear 719 meshes with spur gear 718 which in turn is mounted on shaft 716.

The other end of shaft 716 passes into an insulating cylinder 717 which has a slip ring connected electrically to a spring arm 714. The movement of the aneroid thus causes arm 714 to rotate. Arm 714 is normally in contact with one of (in this case) eight conducting segments 713 mounted on an insulating block 712 through which each segment makes a terminal 813. Each terminal 813 is permanently wired to a corresponding terminal 810 extending through insulating block 811 to a metal button 809. In any particular position one of these buttons 809 is in contact with a spring arm 808 mounted on the end of a shaft 803. On shaft 803 is also mounted a slip ring 814 which is electrically connected to arm 808 of a crystal turret assembly 802 and, at its end-opposite arm 808 to a gear reduction motor 801. Motor 801 connects to power supply 738 through relay contacts 736 which are normally closed when no current flows through coil 737. Arm 714 is electrically connected through slip ring 717 to one end of this coil 737, while arm 808 is connected electrically through slip ring 814 to one terminal of the motor. The other end of coil 737 is connected to power supply 738. Energizing of coil 737 is accomplished from 714, contacts 713, wires 739, contact 809, arm 808, slip ring and brush 814 and thence to the other terminal of power supply 738.

The crystal turret 802 contains eight quartz crystals 732 of different frequency as desired. Each crystal 732 has a pair of contacts 804 which permits engagements with a corresponding pair of conducting spring arms 806 leading to the transmitter oscillator 11. Thus, at any given time only one crystal is operative in oscillator 11.

The mechanical movement of arm 714 by the aneroid system from one sector to another causes the relay 736–737 to de-energize, which in turn starts the motor 801 to rotate. This rotation turns the turret 802 and then the spring arm 808 makes contact with the particular button 809 corresponding to the new position of arm 714. When this contact is made the resulting current re-energizes the relay coil thus opening contacts 736 and stopping the motor.

Where the turret is in the receiver an additional control is provided to allow drum 811 to be rotated in either direction so that a navigator may interrogate an adjacent zone to his own, otherwise, drums 712 and 811 are in fixed position. To avoid sticking on the surface of the sector, an electromagnet can be placed on shaft 716 adjacent to arm 714 and be supplied with an oscillating current. The resulting vibrations of arm 714 preventing sticking. More detailed altitude information can be telemetered over the beacon system by means of frequency, amplitude or pulse code modulation. This can be incorporated on the same CR tube as the bearing-heading indicator or on another indicator.

An alarm 42, which can be of any type whether audible, visible or tactile, is actuated by detector 40 and serves to make the pilot aware of an approaching craft.

The example of antenna configuration illustrated above is not limiting and others having the required directional radiation properties can be used. The particular antenna components described above are particularly suitable for mast mounting. The vertical dipole O is center-fed and its lower element is a hollow quarter-wave choke so that the coaxial feed line may pass through the dipole. The crossed Adcock pairs, each pair comprising vertical folded dipoles, are preferably mounted below the vertical dipole O. Each dipole is equidistant from the axis of the antenna system, preferably ⅛ wavelength from the mast, so that symmetrical quadripole array of dipoles is formed with respect to the axis of the vertical dipole O.

For phase adjustment of the illustrated antenna, it is preferable that: (1) The outputs of power amplifiers 13 and 15 be brought to phase equality and left there. (2) The RF lines from the amplifiers 13 and 15 be made electrically equal up to the joints 21 and 22 (keeping the transmit-receive requirements inviolate). (3) Phase in direction B from BB' be the same with respect to the phase of O. Final adjustments can be made first by adjusting the length of the coaxial cable indicated as phase shifter 24 so that the phase of O is correct. Thus the zero phase position of the system AA' BB' can be set to zero in any direction including the forward direction. Final adjustments are made by rotating the whole antenna system about its axis.

Design criteria follow those well known in the art. Thus, amplifiers in parallel and voltage resistive circuits should be gain stabilized. Filters to be chosen so that their phase shift with frequency is the same within certain preset tolerances. These tolerances are set by the agreed angular accuracy desired in the system. For example, an accuracy of 3° in bearing or heading would require components with maximum tolerance of about 2° in phase. The phase may be allowed to shift with frequency but not the phase difference between components. In general, the transmitter on a particular craft is on $\frac{1}{20}$ to $\frac{1}{50}$ the time the receiver is on. The universal transmitter pulse direction can be arbitrarily selected, e.g. 1000 microseconds or 500 microseconds for each portion of the transmitted signal. A universal frequency for ships could be, for example, 150 megacycles/second, while for planes 400–800 megacycles, with steps of 2–4 megacycles per altitude zone. For best operation it is preferable to make the output of amplifier 34 greater by at least a factor of two than amplifier 29. The T-joints, 21 and 22 are simple connections to permit transmission and reception on the same antenna. With the receiver on, an RF signal from the antenna travels along the transmission line to a T connection 21, 22. The transmitters are off and present a high impedance to the lines. The line length to the transmitters from the T junctions is made in integral number of half-wave lengths of the RF signal in the line since the terminal impedance of an integral number of half wave lengths of line is equal to the input impedance, the transmitters in the off-state present a high impedance at the T junctions. The high impedance of the transmitter at the T junction means little power absorption and the RF power from the antennas travels the receiver branch to the receiver where it is absorbed efficiently by the matched receiver input. Since the transmitters present a slight reactive component when off, the length of the line may be adjusted so that the reflected impedance at the T junction is truly resistive and high when the transmitter is off.

I claim:

1. In a system of radio communication, a pair of stations; each station having means for providing and transmitting two consecutive substantially equal time length RF pulses, two separate antenna components each fed by a separate one of said pulses, one of said components being horizontally isotropic and the other component being characterized in that the RF signal transmitted thereby is horizontally omnidirectionally constant in RF amplitude and has a phase angle which depends on the angle alpha between line of sight to the receiver and a local transmitter reference line; each station having means for receiving RF signals, comprising a first receiver channel fed by a horizontally isotropic antenna component and a second receiver channel fed by an antenna component characterized in that the signal it receives has a phase angle dependent on the angle beta between the line of sight to the transmitter and a local receiver reference line; means responsive to both said channels for processing said received signals so as to yield a signal proportional to the angle beta, and means responsive to said second channel for storing the first received pulse for a period of time substantially equal to the pulse and then processing said pulses to yield a signal proportional to the angle alpha.

2. The system of claim 1 wherein the first RF pulse is fed to said isotropic antenna component.

3. The system of claim 1 wherein random switching means are provided to alternate the operation of transmitter and receiver at each station.

4. In a system of radio communication, means for providing two consecutive substantially equal time-length RF pulses, two separate antenna components, each fed by a separate one of said pulses, one of said components being horizontally isotropic and the other component being characterized in that the RF signal transmitted thereby is omnidirectionally constant in RF amplitude but has a phase angle which depends on the angle alpha formed by the line of sight to a receiver located elsewhere and a selected reference line at the transmitter, a plurality of receiver channels, one channel supplied by an isotropic antenna and a second channel supplied by an antenna which is characterized in that the phase angle of the signal it receives depends on the angle beta formed by the line of sight to a transmitter located elsewhere and a reference line at the receiver; means responsive to two channels for providing a signal proportional to said angle beta; means responsive to one channel for storing the first received pulse until said second pulse begins and means for processing both said pulses so as to yield a signal proportional to said angle alpha.

5. A method for simultaneously determining the relative angles of direction of a plurality of craft, comprising transmitting from each craft a radio signal comprising two consecutive substantially equal time-length RF pulses, one pulse being transmitted isotropically with respect to the transmitting craft and the other pulse being transmitted in approximately equal amplitude in all directions but having a phase displacement when received which is responsive to the angle alpha formed by the direction of motion of the transmitting craft and the line of sight between the transmitting and receiving craft, receiving and decoding said signal on the receiving craft so as to store the first received pulse until the second pulse begins and processing said received pulses so as to provide a first resultant signal responsive to said angle alpha, and simultaneously receiving and processing said signal so as to provide a second resultant signal responsive to the angle beta formed by the line of sight between the two craft and the direction of motion of the receiving craft, and displaying both said resultant signals.

6. Claim 4 wherein random switching means are provided to alternate the operation of transmitter and receiver.

7. Claim 4 wherein said transmission signal means comprises a plurality of separate driver means each supplied by a common RF source and gated by a separate keying modulator means.

8. Claim 5 wherein: substantially only one craft is transmitting at any given time, each craft transmits at a substantially identical RF frequency and no receiver in a particular craft is receiving when its transmitter is on.

References Cited in the file of this patent
UNITED STATES PATENTS

| | | |
|---|---|---|
| 2,112,824 | Brown et al. | Apr. 5, 1938 |
| 2,146,724 | Dunmore | Feb. 14, 1939 |
| 2,157,122 | Dunmore | May 9, 1939 |
| 2,511,030 | Woodward | June 13, 1950 |
| 2,568,568 | Stansbury | Sept. 18, 1951 |

OTHER REFERENCES

"Graphical Symbols For Electrical Diagrams," Y32.2–1954, American Standards Association, 10 East 40th St., New York 16, N.Y.

"Abbreviations For Use on Drawings," Z32.13–1950, American Standards Association, 10 E. 40th St., New York 16, N.Y.